(12) United States Patent
Hamada et al.

(10) Patent No.: US 6,340,311 B1
(45) Date of Patent: Jan. 22, 2002

(54) STRUCTURE FOR CONNECTING A PLURALITY OF BATTERY MODULES TO CONSTITUTE A BATTERY PACK

(75) Inventors: Shinji Hamada, Toyohashi; Noriyuki Fujioka, Kosai; Shuhei Marukawa, Toyohashi; Toyohiko Eto, Toyota, all of (JP)

(73) Assignees: Matsushita Electric Industrial Co., Ltd., Osaka; Toyota Jidosha Kabushiki Kaisha, Aichi, both of (JP)

( * ) Notice: Subject to any disclaimer, the term of this patent is extended or adjusted under 35 U.S.C. 154(b) by 0 days.

(21) Appl. No.: 09/680,294

(22) Filed: Oct. 6, 2000

(30) Foreign Application Priority Data

Oct. 8, 1999 (JP) ............................................ 11-288797

(51) Int. Cl.[7] ............................ H01R 4/24; H01R 4/26; H01R 11/20; H01R 4/44; H01R 11/01
(52) U.S. Cl. ........................................ 439/429; 439/782
(58) Field of Search ................................ 439/429, 782, 439/775

(56) References Cited

U.S. PATENT DOCUMENTS 3,933,522 A * 1/1976 Steig .......................... 136/6 R
5,447,805 A * 9/1995 Harats et al. ................. 429/27
5,766,801 A * 6/1998 Inoue et al. .................. 429/99

* cited by examiner

*Primary Examiner*—Brian Sircus
*Assistant Examiner*—Chandrika Prasad
(74) *Attorney, Agent, or Firm*—Greenblum & Bernstein, P.L.

(57) ABSTRACT

A battery pack is constructed with a plurality of battery modules. Each battery module comprises a plurality of prismatic cell cases having short lateral walls and long lateral walls and respectively accommodating elements for electromotive force, these cells being mutually coupled sharing their short lateral walls as partition walls, thereby constituting an integral battery case. Electrode terminals of positive and negative polarities are arranged at longitudinal opposite ends of the integral battery case. Projections and indentations for positioning the plurality of battery modules when coupling them together with their long side faces abutted each other to constitute the battery pack are formed substantially in the center of given cell cases positioned symmetrical with respect to the centerline in the lengthwise direction of the battery module.

10 Claims, 9 Drawing Sheets

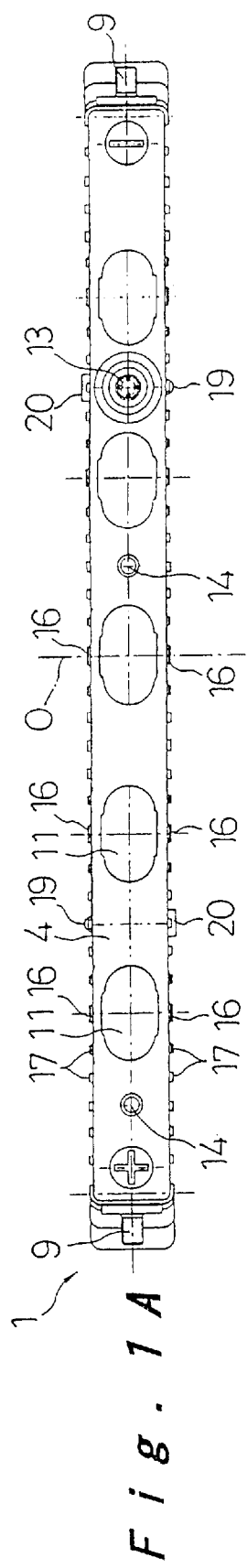

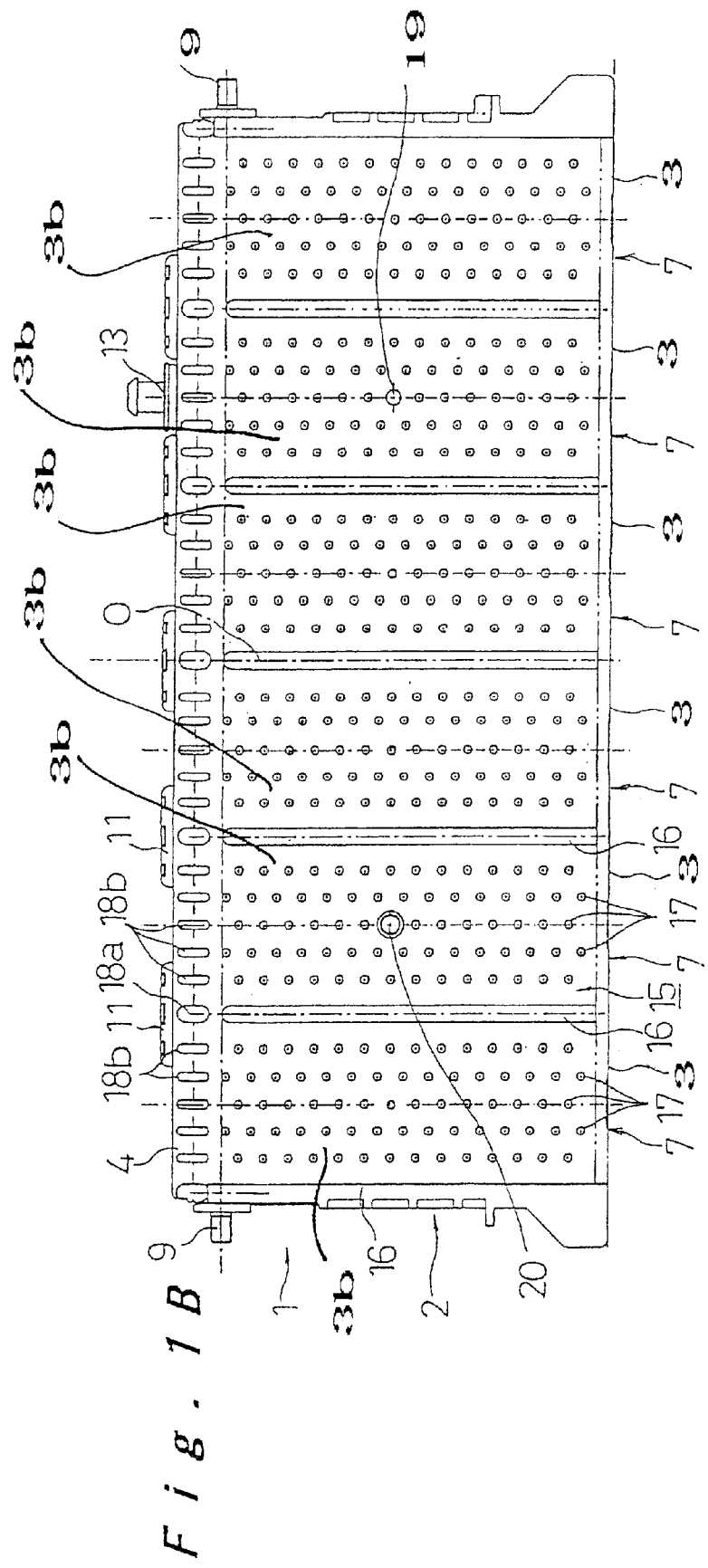

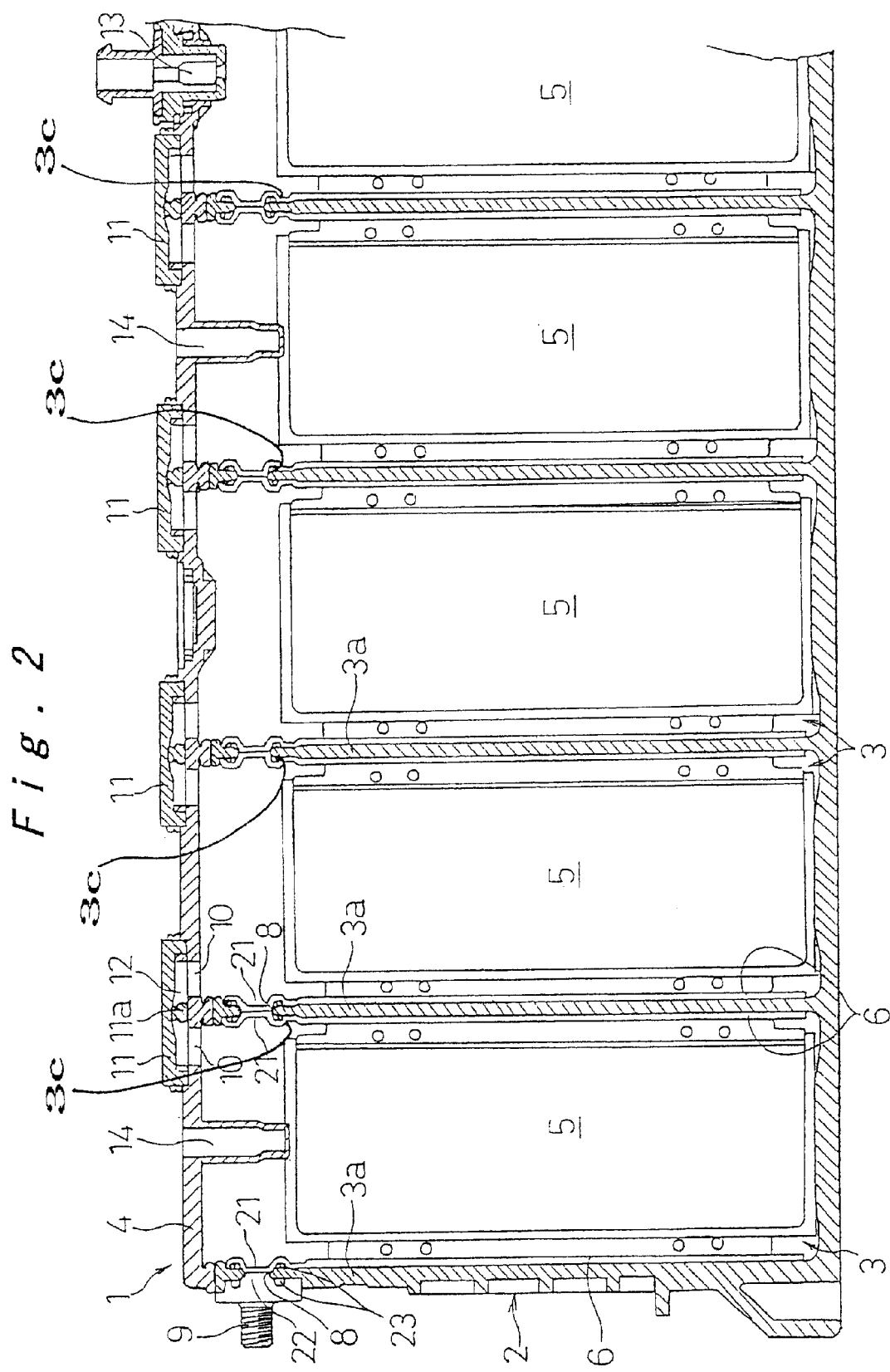

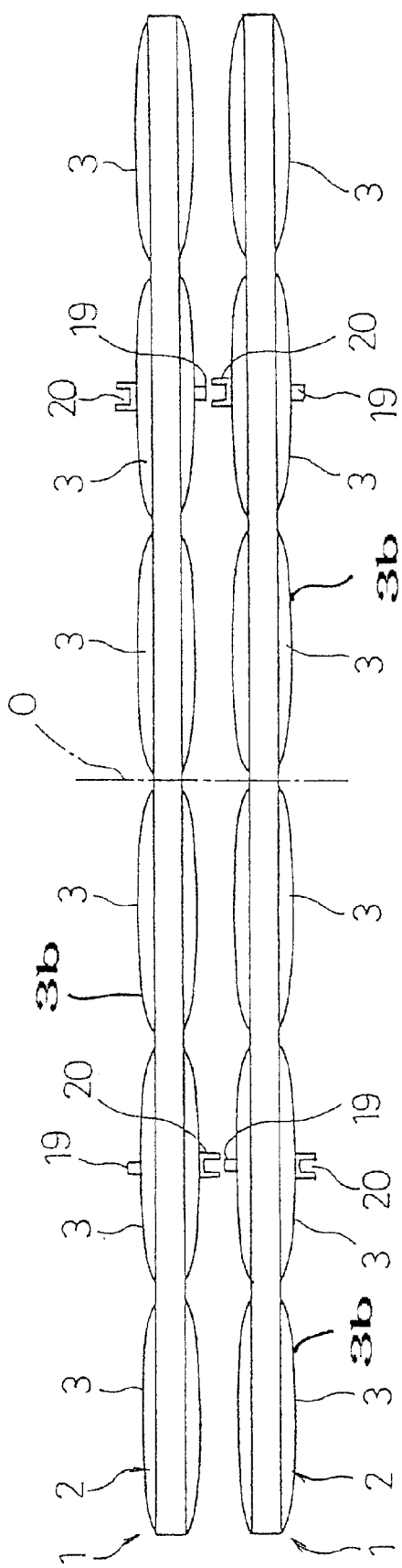

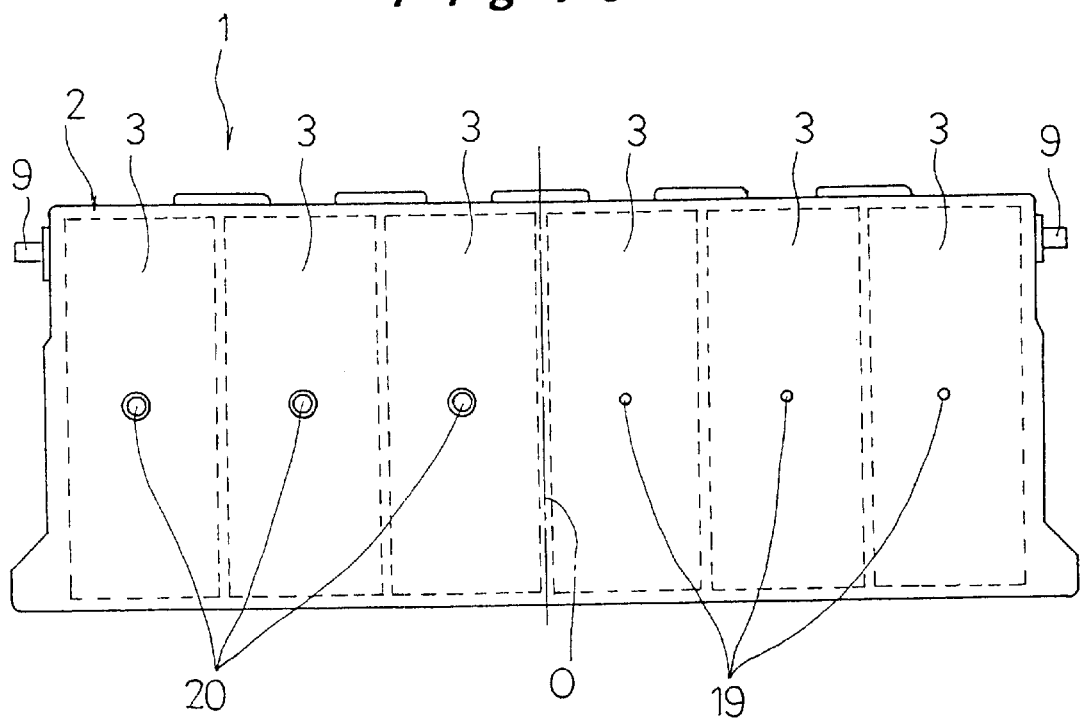

STRUCTURE FOR CONNECTING A PLURALITY OF BATTERY MODULES TO CONSTITUTE A BATTERY PACK

BACKGROUND OF THE INVENTION

1. Field of the Invention

The present invention relates to a battery module provided with a structure for connecting a plurality of such battery modules arranged adjacent each other to constitute a battery pack, with which the plurality of battery modules can be precisely positioned with respect to each other.

2. Description of Related Art

A known battery pack is constructed with a plurality of sealed, flat prismatic battery modules coupled adjacent each other and connected in series. Each of the battery modules comprises a plurality of prismatic cell cases having short lateral walls 41 and long lateral walls 42, these being coupled together, sharing their short lateral walls, thereby constituting an integral battery case, shown in FIG. 7. When the short lateral walls 41 are shared they may also be referred to as "partition walls." Each cell case accommodates therein elements for electromotive force in a sealed condition. The plurality of battery modules are aligned adjacent and positioned with respect to each other by coupling locating projections and corresponding indentations provided on the long side faces of the battery modules. End plates are arranged on the opposite ends in the direction of arrangement of the battery modules, and the battery modules are coupled together by binding these end plates with restricting bands. In this state, electrode terminals arranged at opposite ends in the longitudinal direction of each battery module are connected with each other.

More specifically, referring to FIG. 6, the plurality of battery modules 31 having their positive and negative electrode terminals (not shown) at opposite ends thereof are arranged such that electrode terminals of opposite polarities are arranged aligned alternately. The locating projections 32 and indentations 33 are provided on the long lateral walls of adjacent battery modules 31 so that they face each other. Thus, by fitting the locating projections 32 of one battery module into corresponding indentations 33 of adjacent battery module, the plurality of battery modules 31 can be positioned with respect to each other in their longitudinal direction, and the electrode terminals of both polarities (not shown) are aligned in one line, which are then connected with bus bar modules (not shown).

However, there was the following problem in the above connecting structure of the battery pack. That is, the locating projections 32 and indentations 33 are provided at positions corresponding to partition walls between the plurality of cells 34 that constitute the battery module 31, as shown in FIG. 7. As charging and discharging are repeated, expansion of electrode plates occurs within the cells or the internal pressure within the cells may rise, as a result of which the walls of the cells bulge as shown in the drawing while the partition walls of the cells remain the same. Therefore, if the walls of the cells 34 protrude to a height greater than that of the locating projections 32, the locating projections 32 may come off the indentations 33, whereupon the neighboring battery modules will be dislocated. If, under such state, the battery modules move due to vibration or acceleration acted thereon, the connecting portions between the electrode terminals and bus bars are subjected to a great load, risking damages to the mounting structure of the electrode terminals.

While the entire length of the group of battery modules 31 arranged adjacent each other in the direction of arrangement is restricted by the end plates and restricting bands, since expansion of cell cases as mentioned above occurs in some of the battery modules 31, it can happen that cell cases 34 of some battery modules 31 bulge out, pushing the cell cases of other battery modules.

SUMMARY OF THE INVENTION

In view of these problems of the prior art, it is an object of the present invention to provide an improved structure for connecting battery modules to construct a battery pack, wherein the positioning function of the battery modules is not compromised even when battery cases expand by repeated charging and discharging.

To achieve the above object, a battery module according to the present invention comprises:

a plurality of prismatic cell cases having short lateral walls and long lateral walls coupled together such that each of the short lateral walls of these cell cases is common to two adjacent cell cases, thereby constituting an integral battery case, and each of the cell cases respectively accommodating therein elements for electromotive force;

a positive electrode terminal and a negative electrode terminal arranged at lengthwise opposite ends of the integral battery case; and a locating projection and an indentation formed substantially in the center of cell cases that are positioned symmetrical with respect to a centerline in the lengthwise direction of the integral battery case.

According to the present invention, even when the battery cases expand during charging and discharging, the locating projections do not come off the indentations since they are arranged on portions where the walls of the cell cases bulge out most. Therefore, the battery modules remain fixedly positioned with respect to each other, so that even if they are subjected to vibration or acceleration, the battery modules will not be displaced and there will be no risk that the mounting portions of the electrode terminals are damaged.

The diameter of the projection should preferably be smaller than the diameter of the indentation, so that the projection is received in the indentation loosely to permit expansion or contraction of the cell cases and to accommodate dimensional or positional tolerances.

The projection should preferably be formed in a tapered or hemispherical shape, so that, when the battery modules are roughly aligned adjacent each other, they can be positioned with respect to each other of their own accord. Assembling efficiency of the battery pack can thereby be improved.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 1A is a top plan view and FIG. 1B is a front view showing a battery module according to one embodiment of the present invention;

FIG. 2 is a partial longitudinal cross-sectional side view of the same embodiment;

FIG. 3 is a plan view diagrammatically illustrating the battery module when the cells are bulging;

FIG. 5 is a schematic front view showing a modified example of the same embodiment;

DESCRIPTION OF PREFERRED EMBODIMENTS

Figure 4A:
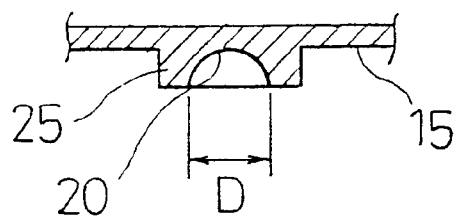
FIG. 4A is an enlarged cross-sectional view of an indentation.
Figure 4B:
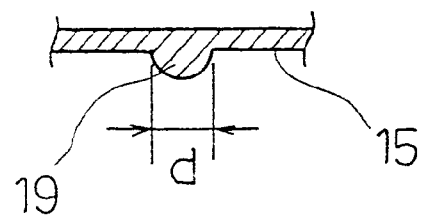
FIG. 4B is an enlarged cross-sectional view of a projection in the battery module of the same embodiment.

The present invention is embodied in the form of a sealed prismatic battery module, constructed with a plurality of prismatic cells. One preferred embodiment of the present invention will be hereinafter described with reference to FIG. 1 to FIG. 4.

The sealed prismatic battery module 1 of this embodiment is a nickel metal hydride battery, which is suitable for use as a drive power source for an electric vehicle. As shown in FIGS. 1 and 2, a battery module 1 is made up of a plurality of (six in the example shown in the drawing) cells, arranged side by side in a row. Cell cases 3 of each of the cells, which are formed in a prismatic fashion with short lateral walls 3a, long lateral walls 3b, and open top ends 3c, are mutually integrated on their short lateral walls 3a, thereby constituting an integral battery case 2. The upper open ends 3c of the cell cases 3 are closed all together by an integral lid member 4.

Each of the cell cases 3 constitutes a cell 7, accommodating therein an electrode plate group 5 including collector plates 6 bonded to the opposite lateral ends of the electrode plate group 5 together with electrolyte. The electrode plate group 5 comprises a large number of positive electrode plates and negative electrode plates arranged parallel to the long lateral walls of the cell cases 3 and layered in the direction of the short lateral walls 3a of the cell cases 3, with intervening separators therebetween.

Connection holes 8 are formed at the upper edge portions of the outer short lateral walls 3a of the cell cases 3 at the two ends of the integral battery case 2 and between each two cell cases 3. Positive and negative connection terminals 9 are respectively mounted to the connection holes 8 at the outer short lateral walls 3a of the two outer cell cases 3, and connection fittings 21 for serially connecting two adjacent cells 7 are mounted to the connection holes 8 in the intermediate short lateral walls between each two cell cases 3.

On the top face of the lid member 4, through holes 10 are formed in adjacent edge portions of neighboring cell cases 3, 3. Communicating lids 11 forming communicating paths 12 for connecting two through holes 10, 10 are welded onto the lid member 4. Numeral 11a denotes reinforcing protrusions protruding from the middle of the inner wall of the communicating lids 11. The size of the reinforcing protrusions 11a is such that they do not close the communicating paths 12, and their leading ends are abutted against and welded to the top face of the lid member 4, ensuring the pressure strength of the communicating lids 11. The integrated battery case 2, the lid member 4 and the communicating lids 11 are made of a synthetic resin material, such as a PP/PPE alloy, and they are repellent against the electrolyte.

In addition, the lid member 4 is provided with one safety vent 13, so as to release pressure when the internal pressure in the cell cases 3 has exceeded a certain value. Moreover, a sensor mounting hole 14 for mounting a temperature detection sensor for detecting the temperature of the cells 7 is formed in the cell cases 3 of suitable cells 7 such that the bottom of the sensor mounting hole contacts the upper end of the electrode plate group 5.

The long lateral walls of six cells 7 together form an integral side wall 15 of the integral battery case 2. On this side wall 15 of the integral battery case 2, protruding ribs 16 that extend vertically are provided at positions corresponding to the lateral edges of two adjacent cell cases 3. Further, a large number of relatively small circular protrusions 17 are formed at suitable intervals in matrix fashion between each two ribs 16. The ribs 16 and the protrusions 17 have the same height. Furthermore, coupling ribs 18a and 18b having the same height as the ribs 16 and the protrusions 17 are formed on the side walls of the upper edge of the cell cases 3 and the side walls of the lid member 4, such as to bridge across the side walls of the cell cases 3 and the lid member 4, at positions corresponding to an extension of the ribs 16 and the protrusions 17. When a plurality of integral battery cases 2 are arranged in a row in parallel to constitute a battery pack, the ribs 16, the protrusions 17 and the coupling ribs 18a and 18b form coolant passages for cooling the cell cases 3 effectively and uniformly.

A protrusion 19 and an indentation 20, for positioning and fitting together integral battery cases 2 when their side walls 15 are abutted on each other, are arranged substantially in the middle of two given cell cases 3 positioned symmetrical with respect to the centerline O indicated by the dot-dash line in FIG. 1A, FIG. 1B, and FIG. 3. The indentation 20 is formed in a projection 25 protruded on the long lateral wall of the cell case 3 as shown in FIG. 4A substantially in the center in the longitudinal direction of a cell case. The projection 25 has a height twice larger than the height of the ribs 16 and projections 17, and its distal end will abut the long lateral wall of the opposite cell case 3, when a plurality of battery modules are arranged adjacent each other. The protrusion 19 is formed protruded on the long lateral wall of the cell case 3. The diameter d of the protrusion 19 is set smaller than the diameter D of the indentation 20, as can be seen from FIGS. 4A and 4B. The protrusion 19 is formed to be substantially hemispherical, and correspondingly, the indentation 20 is formed to have a semicircular cross section.

The aforementioned electrode plate group 5 comprises a large number of positive electrode plates made of Ni foamed metal and negative electrode plates made of Ni punched metal coated with an active material, these electrode plates being laminated alternately, wherein the positive electrode plates are covered with separators in the form of a bag having an opening on one side. The positive electrode plates and the negative electrode plates with intervening separators therebetween thereby constitute the electrode plate group 5. The lateral edges of the group of positive electrode plates protrude beyond the group of negative electrode plates on one side, and the lateral edges of the group of negative electrode plates protrude beyond the group of positive electrode plates on the opposite side, and collector plates 6 are welded respectively to the lateral edges of the positive and negative electrode plates.

The collector plate 6 are welded to the opposite lateral edges of the electrode plate group 5. As shown in FIG. 2, at the upper edge of a collector plate 6, a connection projection 21 is formed such as to protrude outwards. By fitting this connection projection 21 into a connection hole 8 formed at the upper edge of the short lateral wall 3a of the cell case 3, the electrode plate group 5 is fixedly positioned with respect to the cell case. As can be seen from FIG. 2, a plurality of cells 7 are arranged adjacent each other, with the connection projections 2 of the collector plates 6 being fitted in the connection holes 8 in the short lateral walls 3a of the cell cases 3 and welded together. Thereby, the electrode plate group 5 of each of the cells 7 is fixed on the short lateral walls 3a of respective cell cases 3, as well as mutual electrical connection between adjacent cells 7 is achieved.

On the outer face of the short lateral walls 3a of the cells at opposite outer ends of the battery module 1, an electrode terminal 9 is attached. The electrode terminal 9 is also provided with a connection projection 22 that can fit into the connection hole 8, so that it can be welded to the connection projection 21 of the collector plate 6. Annular grooves are formed around the connection projections 21, 22 of the collector plates 6 and the electrode terminal 9, in which O-rings 23 are fitted so as to seal the holes in the short lateral walls 3a.

When a plurality of battery modules 1 are arranged adjacent each other with their long side faces 15 abutted, the projections 19 fit in the indentations 20, whereby the battery modules are positioned relative to each other in the lengthwise direction. In this state, even when the battery cases 3 expand as shown in FIG. 3 during charging and discharging, the projections 19 do not come off the indentations 20 since they are arranged on portions where the walls of the cell cases bulge out most. Therefore, the battery modules remain fixedly positioned with respect to each other, so that even if they are subjected to vibration or acceleration, the battery modules will not be displaced and there will be no risk that the mounting portions of the electrode terminals are damaged.

The diameter d of the projection 19 is set smaller than the diameter D of the indentation 20, so that the projection 19 is received in the indentation 20 loosely, in order to allow for expansion and contraction of the integral battery cases 2 of the battery modules, and to accommodate dimensional and positional tolerances. Furthermore, due to the hemispherical shape of the projection 19 and the indentation 20 of corresponding shape, assembling of a battery pack can be remarkably efficiently accomplished. That is, in the process step of arranging a plurality of battery modules adjacent each other, they need not be precisely positioned with respect to each other, because, when binding the battery modules with restricting bands together with the end plates, the projections 19 fit in the indentations 20 of their own accord and the battery modules are mutually positioned.

Figure 4C:
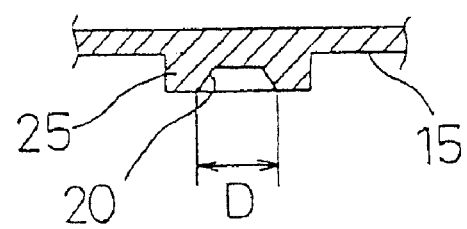
FIG. 4C is an alternative embodiment of an enlarged cross-sectional view of an indentation.
Figure 4D:
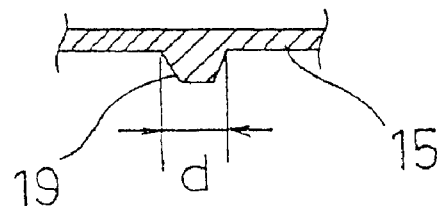
FIG. 4D is an enlarged cross-sectional view of a projection in the battery module of the alternative embodiment.
Figure 6:
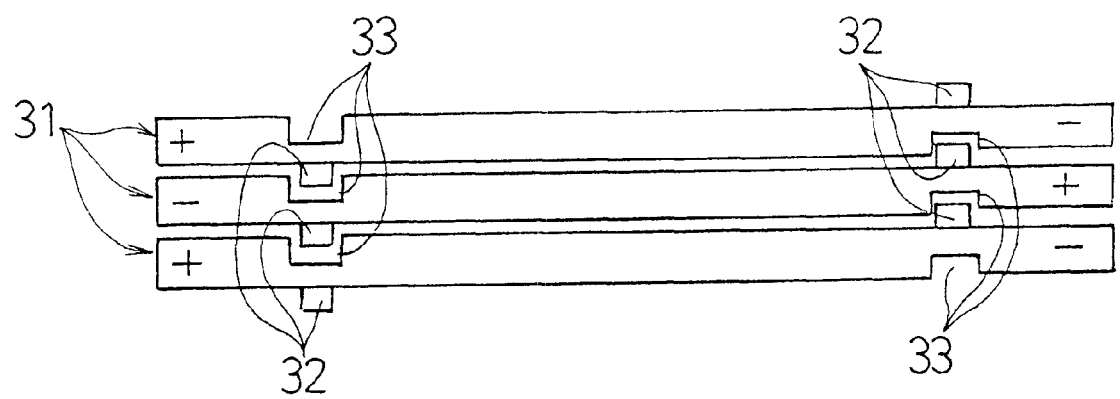
FIG. 6 is a plan view diagrammatically illustrating a plurality of conventional battery modules arranged adjacent each other, being positioned with the projections and indentations.
Figure 7:
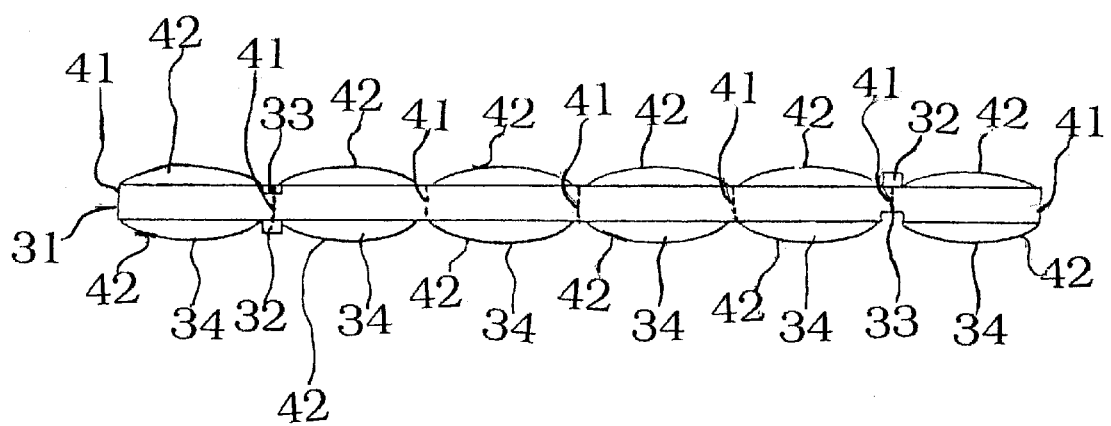
FIG. 7 is a plan view diagrammatically illustrating the same conventional battery module when the cells are bulging.

Instead of the projection of hemispherical shape as shown in the above described embodiment, a tapered shape may be adopted with similar effects and benefits, as shown in FIGS. 4C and 4D. The indentation 20 should not necessarily have a cross section that corresponds to the shape of the projection 19, and may be formed simply in a circular shape or the like, as long as it can receive the projection 19. Of course, the shape of the projection 19 should not be limited to the hemispherical or tapered one, but can be a column with a circular or oblong cross-section.

In the battery module 1 of the present invention, since the neighboring cells 7 are connected within the integral battery case 2 and the connection configuration of the cells 7 is not exposed to the outside, the installation space for the battery module 1 can be made compact. Further, since the neighboring cells 7 are connected in series by welding the connection projections 21 formed on the collector plates 6 by press-molding, no additional components for connection are necessary. Therefore, the cells can be connected simply with a reduced number of components at low cost. Moreover, because the connection projections 21 are integral with the collector plates 6 and the abutted connection projections 21 are welded together at one point, the electric resistance at the connecting portions is remarkably low.

Furthermore, in the electrode plate groups 5 of the cells 7, the lateral edge portions of the group of positive electrode plates protrude beyond the group of negative electrode plates on one side, and the lateral edge portions of the group of negative electrode plates protrude beyond the group of positive electrode plates on the opposite side, and collector plates 6 are welded to these protruded lateral edge portions over their entire length. Therefore, the average distance from the surfaces of the electrode plates to the collector plates 6 can be made short, and as a result, the internal battery resistance can be made small and the utilization rate of the electrode active material becomes large, which increases the battery output.

Moreover, on the top face of the lid member 4, through holes 10 are formed in adjacent edge portions of neighboring cell cases 3, 3. Communicating lids 11 forming communicating paths 12 for connecting two through holes 10, 10 are welded onto the lid member 4. Thereby, the internal pressure between the plurality of cells can be made uniform, and it is prevented that life of particular cells 7 is decreased by partial rise in the internal pressure. Life of the entire battery module 1 is thereby prevented from being diminished. Moreover, it is only necessary to provide a single safety vent 14 on the lid member 4, and a further decrease in cost can be achieved.

In the foregoing embodiment, as one example, the projection 19 and the indentation 20 have been described as being provided one each at positions symmetrical with respect to the centerline O in the lengthwise direction of the battery module 1. However, the number and the arrangement of the projections 19 and indentations 20 should not be limited to this and they may be provided on any given cell cases 3. For example, as shown in FIG. 5, projections 19 and indentations 20 can be provided three each in the center of the cell cases 3 on both sides of the centerline O, so that the projections 19 will respectively fit in corresponding indentations 20 on the long side face of an adjacent battery module when several battery modules are arranged adjacent each other.

In the foregoing embodiment and in the examples shown in FIGS. 1 to 3, on the cell cases 3 at positions symmetrical with the centerline O in the lengthwise direction of the integral battery case 2 where projections 19 and indentations 20 are provided, the projection 19 and indentation 20 are formed on the opposite faces of the cell case 3. Instead of such arrangement, projections 19 may be provided on the opposite faces of one cell case 3, and indentations 20 may be provided on the opposite faces of the other cell case 3. With such arrangement, when arranging a plurality of battery modules adjacent each other, the projections 19 will not be received in the indentations 20 unless the battery modules are arranged oppositely so that the positive and negative electrode terminals 9 of neighboring battery modules are alternately aligned. Accordingly, it is prevented that the electrode terminals 9 of the same polarity are aligned adjacent each other and short-circuited.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery module comprising:

a plurality of prismatic cell cases defined by opposed short lateral walls and opposed long lateral walls, and coupled together such that a cell case of said plurality of cell cases shares a common wall with another adjacent cell case of said plurality of cell cases, said plurality of cell cases forming an integral battery case having opposed ends, each cell case of said plurality of cell cases configured to accommodate elements for electromotive force therein;

a positive electrode terminal arranged at one end of said opposed ends of said integral battery case, and a negative electrode terminal arranged at the other end of said opposed ends of said integral battery case;

a locating projection located at substantially the center of one long lateral wall of said opposed lateral walls of a said cell case; and an indentation located at substantially the center of the other long lateral wall of said opposed lateral walls of a said cell case.

2. The battery module according to claim 1, wherein the diameter of the projection is smaller than the diameter of the indentation.

3. The battery module according to claim 1, wherein the projection is formed in a hemispherical shape.

4. The battery module according to claim 1, wherein the projection is formed in a tapered shape.

5. The battery module according to claim 1, wherein said locating projection and said indentation are located substantially equidistant from and on opposed sides of a centerline, the centerline substantially orthogonal to a lengthwise direction between said opposed ends.

6. A battery pack comprising:

a plurality of battery modules configured to connect together, each battery module of said plurality of battery modules comprising:

a) a plurality of prismatic cell cases defined by opposed short lateral walls and opposed long lateral walls, and coupled together such that a cell case of said plurality of cell cases shares a common wall with another adjacent cell case of said plurality of cell cases, said plurality of cell cases forming an integral battery case having opposed ends, each cell case of said plurality of cell cases configured to accommodate elements for electromotive force therein;

b) a positive electrode terminal arranged at one end of said opposed ends of said integral battery case, and a negative electrode terminal arranged at the other end of said opposed ends of said integral battery case;

c) a locating projection located at substantially the center of one long lateral wall of said opposed lateral walls of a said cell case; and d) an indentation located at substantially the center of the other long lateral wall of said opposed lateral walls of a said cell case; wherein:

a said positive electrode terminal of one battery module of said plurality of battery modules and a said negative electrode terminal of another battery module of said plurality of battery modules are adjacent to each other; and a said indentation of one battery module of said plurality of battery modules and a said locating projection of another battery module of said plurality of battery modules are configured to connect together.

7. The battery pack according to claim 6, wherein the diameter of the projection is smaller than the diameter of the indentation.

8. The battery pack according to claim 6, wherein the projection is formed in a hemispherical shape.

9. The battery pack according to claim 6, wherein the projection is formed in a tapered shape.

10. The battery pack according to claim 6, wherein said locating projection and said indentation are located substantially equidistant from and on opposed sides of a centerline, the centerline substantially orthogonal to a lengthwise direction between said opposed ends.

* * * * *